United States Patent
Sacripante et al.

(10) Patent No.: US 10,323,156 B2
(45) Date of Patent: *Jun. 18, 2019

(54) METHOD OF THREE-DIMENSIONAL PRINTING

(71) Applicant: XEROX CORPORATION, Norwalk, CT (US)

(72) Inventors: Guerino G. Sacripante, Oakville (CA); Ke Zhou, Oakville (CA)

(73) Assignee: XEROX CORPORATION, Norwalk, CT (US)

(*) Notice: Subject to any disclaimer, the term of this patent is extended or adjusted under 35 U.S.C. 154(b) by 36 days.

This patent is subject to a terminal disclaimer.

(21) Appl. No.: 15/664,952

(22) Filed: Jul. 31, 2017

(65) Prior Publication Data

US 2017/0327704 A1  Nov. 16, 2017

Related U.S. Application Data

(63) Continuation of application No. 14/537,215, filed on Nov. 10, 2014, now Pat. No. 9,771,487.

(51) Int. Cl.

| | |
|---|---|
| B29C 41/02 | (2006.01) |
| B29C 71/00 | (2006.01) |
| C08L 67/04 | (2006.01) |
| C09D 11/104 | (2014.01) |
| B33Y 10/00 | (2015.01) |
| B33Y 70/00 | (2015.01) |
| B29C 48/05 | (2019.01) |
| B29C 48/92 | (2019.01) |
| B29C 64/118 | (2017.01) |
| B29C 64/30 | (2017.01) |
| B33Y 80/00 | (2015.01) |
| B29C 64/106 | (2017.01) |
| B29K 67/00 | (2006.01) |
| B29L 9/00 | (2006.01) |
| B29C 48/00 | (2019.01) |
| B29C 48/78 | (2019.01) |
| B29C 48/88 | (2019.01) |

(52) U.S. Cl.
CPC ............ *C09D 11/104* (2013.01); *B29C 48/05* (2019.02); *B29C 48/92* (2019.02); *B29C 64/106* (2017.08); *B29C 64/118* (2017.08); *B29C 64/30* (2017.08); *B33Y 10/00* (2014.12); *B33Y 70/00* (2014.12); *B33Y 80/00* (2014.12); *B29C 48/001* (2019.02); *B29C 48/022* (2019.02); *B29C 48/78* (2019.02); *B29C 48/911* (2019.02); *B29C 2948/92695* (2019.02); *B29C 2948/92704* (2019.02); *B29K 2067/00* (2013.01); *B29K 2067/04* (2013.01); *B29K 2995/002* (2013.01); *B29K 2995/006* (2013.01); *B29L 2009/00* (2013.01)

(58) Field of Classification Search
CPC ....... B29C 41/02; B29C 64/118; B29C 64/30; B29C 71/00; B29K 2067/04; B29K 2995/002; B29K 2995/006; C08L 67/04; C09D 11/104
USPC .................................. 264/237, 308, 331.21
See application file for complete search history.

(56) References Cited

U.S. PATENT DOCUMENTS

| | | |
|---|---|---|
| 5,121,329 A | 6/1992 | Crump |
| 5,556,727 A | 9/1996 | Ciccarelli et al. |
| 5,691,424 A | 11/1997 | Suzuki |
| 5,997,795 A | 12/1999 | Danforth |
| 6,194,483 B1 | 2/2001 | Tsai |
| 2005/0059757 A1 | 3/2005 | Bredt et al. |
| 2008/0234754 A1 | 9/2008 | McCarthy |
| 2011/0003243 A1 | 1/2011 | Sacripante |
| 2014/0018511 A1 | 1/2014 | Yunomura et al. |
| 2014/0205786 A1 | 7/2014 | Nederberg |
| 2015/0056550 A1 | 2/2015 | Sacripante et al. |
| 2015/0111145 A1 | 4/2015 | Sacripante et al. |
| 2015/0141584 A1 | 5/2015 | Saywell |
| 2015/0265438 A1 | 9/2015 | Hossainy |
| 2016/0130451 A1 | 5/2016 | Sacripante |
| 2016/0185050 A1* | 6/2016 | Topolkaraev ........... B29C 64/40 264/308 |

FOREIGN PATENT DOCUMENTS

| | | |
|---|---|---|
| CN | 103992628 A | 8/2014 |
| JP | 2010241861 A | 10/2010 |

OTHER PUBLICATIONS

Abstract of CN 103992628 A (published on Aug. 20, 2014).
Machine Translation of CN 103992628 A (published on Aug. 20, 2014).
"Molar Mass Distribution" Wikipedia (downloaded from https://en.wikipedia.org/wiki/Molar_mass_distribution on Sep. 14, 2016).

* cited by examiner

*Primary Examiner* — Leo B Tentoni
(74) *Attorney, Agent, or Firm* — Pillsbury Winthrop Shaw Pittman LLP

(57) ABSTRACT

A sustainable material suitable for three-dimensional printing is disclosed. The sustainable material comprises a resin derived from a bio-based diacid monomer and a bio-based glycol monomer. The resulting sustainable material provides a much more robust 3-D printing material with different properties than conventional materials.

18 Claims, No Drawings

METHOD OF THREE-DIMENSIONAL PRINTING

CROSS-REFERENCE TO RELATED APPLICATIONS

This application is a continuation of U.S. application Ser. No. 14/537,215, filed Nov. 10, 2014, which is now U.S. Pat. No. 9,771,487, with an issue date of Sep. 26, 2017.

TECHNICAL FIELD

The present embodiments relate to three-dimensional (3-D) printing. More specifically, there is provided a sustainable bio-based composition for use in applications related to printing 3-D objects, ink compositions comprising the sustainable bio-based composition for printing 3-D objects and methods of using the same.

BACKGROUND

Three-dimensional (3-D) printing has been a popular method of creating various prototypes. There are several different methods of 3-D printing, but the most widely used and the least expensive is a process known as Fused Deposition Modeling (FDM). FDM printers use a thermoplastic filament, which is heated to its melting point and then extruded, layer by layer, to create a three dimensional object.

FDM printers use a printing material, which constitutes the finished object, and a support material, which acts as a scaffolding to support the object as it is being printed. The most common printing material for FDM is acrylonitrile butadiene styrene (ABS) which is a thermoplastic and has a glass transition temperature of about 105° C. Another common printing material for FDM is poly-lactic acid (PLA) which is a biodegradable thermoplastic aliphatic polyester derived from renewable resources and has a glass transition temperature 60-65° C. Both ABS and PLA are easily melted and fit into small molds. These plastics typically must be heated to between 180 to 260° C. in order to melt. Concerns have been raised over health issues associated with decomposition of the thermoplastics during heating, such as ABS at, wherein it can release volatile organic compounds (VOCs) such as styrene, ethylbenzene, and acrylonitrile during heating. PLA, also has issues with the removal from support material, as well as moisture absorption, bubble spurting at the nozzle, discoloration and reaction with water at high temperatures that undergo de-polymerization.

Thus, there exists a need to develop different materials for use in FDM printers and with varying robust properties, including having higher impact strength, being non-moisture sensitive and not emitting VOC's There also exists a desire to produce other 3D materials with properties different from the materials currently available on the market so that manufacturers and consumers can select the properties needed for the 3D object being created. In addition, there is always a desire to also find more environmental friendly materials such as those derived from renewable resources. The ultimate goal is to find high quality, lower cost and "green" 3-D printing materials such that these printers may become more accessible and useful to the average consumer, as well as manufacturers.

BRIEF SUMMARY

According to embodiments illustrated herein, there is provided a sustainable three-dimensional printing material comprising a sustainable resin derived from a bio-based diacid and bio-based glycol monomer; a colorant; and an optional additive.

In certain embodiments, the disclosure provides a sustainable three-dimensional printing material comprising: a sustainable resin derived from a bio-based succinic acid and bio-based 1,4-butane-diol as shown by the reaction scheme below:

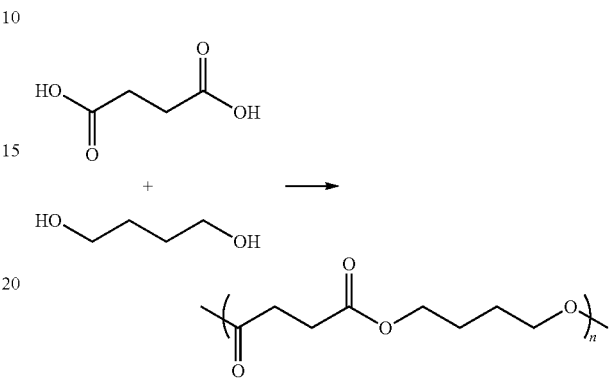

wherein n is from about 100 to about 100,000; a colorant; and an optional additive.

In yet further embodiments, there is provided a method of printing comprising providing a thermoplastic filament, wherein the thermoplastic filament further comprises a sustainable resin derived from a bio-based diacid monomer and bio-based glycol monomer, a colorant, and an optional additive; heating the thermoplastic filament to its melting point; extruding the melted thermoplastic filament layer by layer; and forming a three-dimensional object from the layers of melted thermoplastic filament.

DETAILED DESCRIPTION

In the following description, it is understood that other embodiments may be used and structural and operational changes may be made without departing from the scope of the present disclosure.

Energy and environmental policies, increasing and volatile oil prices, and public/political awareness of the rapid depletion of global fossil reserves have created a need to find sustainable monomers derived from recycled plastics and biomaterials. Such monomers can be used for a wide field of applications.

The present embodiments disclose a sustainable material suitable for 3-D printing including a resin obtained from the fermentation of bio-based materials. The present embodiments derive a sustainable resin from the fermentation of glucose derived from corn or corn starch. As will be discussed more fully below, the resin has demonstrated desirable properties for use in 3D printing.

The terms "optional" or "optionally" as used herein means that the subsequently described event or circumstance can or cannot occur, and that the description includes instances where a said event or circumstance occurs and instances where it does not.

The terms "three-dimensional printing system," "three-dimensional printer," "printing," and the like generally describe various solid freeform fabrication techniques for making three-dimensional objects by selective deposition, jetting, and fused deposition modeling.

The term "freezing" as used herein refers to the solidifying, gelling or hardening of a material during the three dimensional printing process.

The term "sustainable" includes recycled or recyclable materials as well as biomass or bio-derived or bio-based materials. There materials are generally considered environmentally friendly. The terms "bio-derived" or "bio-based" are used to mean a resin comprised of one or more monomers that are derived from plant material. By using bio-derived feedstock, which are renewable, manufacturers may reduce their carbon footprint and move to a zero-carbon or even a carbon-neutral footprint. Bio-based polymers are also very attractive in terms of specific energy and emission savings. Utilizing bio-based feedstock can help provide new sources of income for domestic agriculture, and reduce the economic risks and uncertainty associated with reliance on petroleum imported from unstable regions.

The sustainable resin of the present embodiments may be derived from bio-based diacid and a bio-based glycol. Examples of the bio-based diacid employed for producing the present bio-derived resin includes, but are not limited to, succinic acid, 2,5-furandicarboxylic acid, itaconic acid and mixtures thereof. Examples of bio-based glycols employed for producing the present bio-derived resin includes, but are not limited to, 1,4-butane-diol, 1,3-propane-diol, 1,2-propanediol and mixtures thereof.

In a specific embodiment, the diacid is a bio-based succinic acid and the glycol is a bio-based 1,4-butane-diol. In such embodiments, the succinic acid may be obtained from the fermentation of corn derived glucose such as, for example, corn syrup. From this bio-based succinic acid, 1-4-butane-diol can then be derived by an hydrogenation reduction process. More specifically, bio-based succinic acid can be obtained by a bacterial or a low pH yeast fermentation with downstream processing by direct crystallization. In embodiments, the sustainable resin may be selected from the group consisting of poly-(butylene-succinate), poly-(butylene-2,5-furanate), poly-(butylene-itaconate), poly-(propylene-succinate), poly-(propylene-2,5-furanate), poly-(propylene-itaconate) and mixtures thereof. In one embodiment the sustainable resin is poly-butylene-succinate (PBS) produced through the reaction of bio-based succinic acid and 1,4-butane-diol as shown by the reaction scheme below:

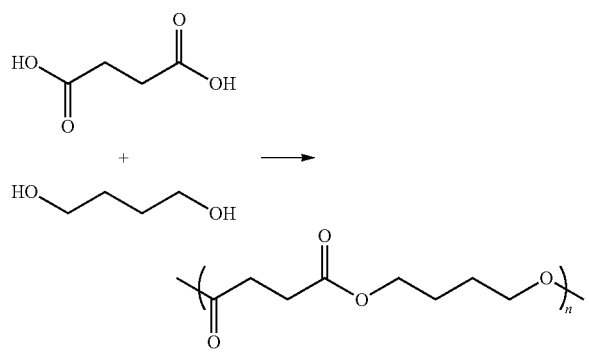

wherein n is greater than 100, or from about 100 to about 100,000. In these embodiments, the weight average molecular weight of the resin is from about 10,000 grams/mole to about 500,000 grams/mole, or from about 10,000 grams/mole to about 100,000 grams/mole. In the present embodiments, the molecular weight and value of n need to be high so that the resulting resin is very hard and flexible, properties that are desirable for printing of 3D objects. This requirement is different from other printing technologies, such as for example, printing with toners which only require simple printing on flat substrates like paper.

In some embodiments, the sustainable resin has a Young's ranging from about from about 0.5 gigapascals (GPa) to about 5 GPa, from about 1 GPa to about 3 GPa, or from about 1 GPa to about 2 GPa.

In some embodiments, the sustainable resin has a Yield Stress ranging from about 10 megapascals (MPa) to about 100 MPa, from about 20 MPa to about 80 MPa, from about 40 MPa to about 65 MPa, or from about 40 MPa to about 60 MPa.

Young's modulus and Yield Stress can be measured using the 3300 Mechanical Testing Systems available from Instron, by the ASTM 638D method and using the sustainable resin filament of about 2 mm in diameter.

Based on the assessment of the mechanical properties of the filaments, there is reason to believe that the mechanical properties of any resulting 3D structure printed from the resin filaments would be the same. Thus, benefits of the present embodiments include reduced costs and the use of sustainable raw materials, and improved mechanical properties of structures printed with 3D Fused Deposition Modelling (FDM) printers using such raw materials.

In embodiments, the sustainable resins may be derived from about 45 to about 55 percent by mole equivalent, from about 48 to about 52 percent by mole equivalent, or from about 49.5 to about 50.5 percent by mole equivalent of bio-based glycol, and from about 45 to about 55 percent by mole equivalent from about 48 to about 52 by mole equivalent, or from about 49.5 to about 50.5 by mole equivalent of the succinic acid, provided that the sum of both is 100 mole equivalent.

A sustainable resin described herein has a softening point and a freezing point consistent with the temperature parameters of one or more 3D printing systems. In some embodiments, a sustainable resin has a softening point ranging from about 120° C. to about 250° C., from about 150° C. to about 200° C., or from about 155° C. to about 185° C. In some embodiments, a sustainable resin has a freezing point ranging from about 10 C to about 100° C., from about 20° C. to about 75° C., or from about 25° C. to about 60° C.

The softening point (Ts) of the sustainable resin, can be measured by using the cup and ball apparatus available from Mettler-Toledo as the FP90 softening point apparatus and using the Standard Test Method (ASTM) D-6090. The measurement can be conducted using a 0.50 gram sample and heated from 100° C. at a rate of 1° C./min.

In some embodiments, the sustainable resin has a viscosity consistent with the requirements and parameters of one or more 3-D printing systems. In some embodiments, a bio-derived resin described herein has a viscosity ranging from about 100 centipoise to about 10,000 centipoise, from about 100 centipoise to about 1,000 centipoise, or from about 400 centipoise to about 900 centipoise at a temperature of about 150° C.

In some embodiments, the sustainable resin has a viscosity consistent with the requirements and parameters of one or more 3-D printing systems. In some embodiments, a sustainable resin described herein has a viscosity ranging from about 200 centipoise to about 10,000 centipoise, from about 300 centipoise to about 5,000 centipoise, or from about 500 centipoise to about 2,000 centipoise at a temperature of from about 100 to about 200° C.

In some embodiments, a sustainable resin has a Tg of from about 50° C. to about 120° C., from about 60° C. to about 100° C., or from about 65° C. to about 95° C.

The glass transition Temperature (Tg) and melting point (Tm) of the sustainable resin, can be recorded using the TA Instruments Q1000 Differential Scanning Calorimeter in a temperature range from 0 to 150° C. at a heating rate of 10° C. per minute under nitrogen flow. The melting and glass transition temperatures can be collected during the second heating scan and reported as the onset.

In some embodiments, the sustainable resin has a Young's ranging from about from about 0.5 gigapascals (GPa) to about 5 GPa, from about 1 GPa to about 3 GPa, or from about 1 GPa to about 2 GPa.

In some embodiments, the sustainable resin has a Yield Stress ranging from about 10 megapascals (MPa) to about 100 MPa, from about 20 MPa to about 80 MPa, from about 40 MPa to about 65 MPa, or from about 40 MPa to about 60 MPa.

Young's modulus and Yield Stress can be measured using the 3300 Mechanical Testing Systems available from Instron, by the ASTM 638D method and using the sustainable resin filament of about 2 mm in diameter.

In some embodiments, a sustainable resin described herein is non-curable. The sustainable resin described herein is biodegradable.

The sustainable resin can be melt blended or mixed in an extruder with other ingredients such as pigments/colorants.

Typically, the sustainable resin of the present embodiments is present in the 3-D printing material in an amount of from about 85 to about 100 percent by weight, or from about 90 to about 99 percent by weight, or from about 95 to about 100 percent by weight of the total weight of the material. To obtain a clear 3-D printing material, 100% of the sustainable resin of the present embodiments may be used. To obtain a colored 3-D printing material having a color such as black, cyan, red, yellow, magenta, or mixtures thereof, the material may contain from about 3% to about 15%, from about 4% to about 10%, or from about 5% to about 8% of colorant by weight based on the total weight of the material. In certain embodiments, the sustainable 3-D printing material consist of two components namely a colorant and a sustainable resin of the present disclosure, as such the resin makes up the remainder amount by weight of the material.

The resulting sustainable 3-D printing material of the present embodiments may include particles having a mean particle diameter of from 10 micrometers to 10 meters, from 10 micrometers to 1 meters, or from 100 micrometers to 0.3 meters.

As described above, the 3-D printing material can further comprise a colorant, and/or one or more additives.

Colorants

Various suitable colorants of any color can be present in the 3-D printing materials, including suitable colored pigments, dyes, and mixtures thereof including REGAL 330®; (Cabot), Acetylene Black, Lamp Black, Aniline Black; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like; cyan, magenta, yellow, red, green, brown, blue or mixtures thereof, such as specific phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include, copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5-dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant, more specifically black, cyan, magenta and/or yellow colorant, is incorporated in an amount sufficient to impart the desired color to the 3-D printing material. In general, pigment or dye is selected, for example, in an amount of from about 1 to about 60 percent by weight, or from about 2 to about 10 percent by weight for color 3-D printing material, and about 3 to about 60 percent by weight for black 3-D printing material.

Other Additives

Depending on the requirements of the final 3D object to be formed, other additive materials may be included in the 3D printing material. For example, specific fillers or conductive materials may be included. In specific embodiments, certain metals may be included as additives for printing electronic parts or circuit boards. In such embodiments, the amount of additives present in the 3D printing material may be from about 5 to about 40 by weight of the total weight of the 3D printing material.

The sustainable 3-D printing material of the present embodiments can be prepared by a number of known methods including melt mixing and extrusion of the sustainable resin, and an optional pigment particles or colorants.

In an embodiment, a method of printing using the sustainable resin comprises providing a thermoplastic filament, wherein the thermoplastic filament further comprises a sustainable resin; and a colorant, wherein the sustainable resin is derived from a bio-based succinic acid and bio-based glycol (1,4-butane-diol) oligomer; heating the thermoplastic filament to its melting point; extruding the melted thermoplastic filament layer by layer; and forming a three-dimensional object from the layers of melted thermoplastic filament. A FDM printing machine has the capability of being heated up to 250° C. In embodiments, the heating step for the present method is conducted at a temperature of from about 160 to about 260° C., or from about 180 to about 240° C., or from about 200 to about 220° C. These temperature ranges are selected to provide a viscosity appropriate for jetting the layers required to form the 3D object. In further embodiments, the method comprises cooling and solidifying the formed three-dimensional object. Depending on the 3D object to be formed, the number of layers printed may range from about 10 to about 100,000, or from about 100 to about 100,000.

Other methods include those well known in the art such as flow able extrudate, with or without agitation, and brought to the desired operating temperature, typically above the initial melting temperature of the polymer, and then extruded and drawn to obtain the desired molecular orientation and shape.

EXAMPLES

The examples set forth herein below are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter. The synthesis of PBS resins of varying molecular weights are described below:

Example 1

Synthesis of Sustainable Resin: Polybutylene-Succinate

Succinic acid (295.29 g), 1,4-butane-diol (293.18 g) and FASCAT 4100 (2.01 g) was charged into a 1 Liter Parr reactor equipped with a mechanical stirrer, distillation apparatus and bottom drain valve. The mixture was heated to 160° C. under a nitrogen purge (1 scfh), and then slowly increased to 190° C. over a 3 hour period and maintained for an additional 19 hours, during which time; water was collected as the byproduct. The reaction temperature was then increased to 205° C. and then vacuum was applied to remove the excess 1,4-butanediol to allow further polycondensation. The mixture was then heated at 225° C., whilst under vacuum, until a viscosity of 418.5 cps at 150° C. was obtained.

Example 2

Synthesis of Sustainable Resin: Polybutylene-Succinate

Succinic acid (295.30 g), 1,4-butane-diol (293.11 g) and FASCAT 4100 (2.01 g) was charged into a 1 Liter Parr reactor equipped with a mechanical stirrer, distillation apparatus and bottom drain valve. The mixture was heated to 160° C. under a nitrogen purge (1 scfh), and then slowly increased to 195° C. over a 3 hour period and maintained for an additional 19 hours, during which time; water was collected as the byproduct. The reaction temperature was then increased to 205° C. and then vacuum was applied to remove the excess 1,4-butanediol to allow further polycondensation. Whilst under vacuum, the mixture was then heated at 250° C., until a viscosity of 336.8 cps at 165° C. was obtained.

Higher viscosity and molecular weights can be obtained by prolonging the polycondensation reaction.

Example 3

Synthesis of Sustainable Resin: Polybutylene-Succinate

Succinic acid (591.05 g), 1,4-butane-diol (587.5 g) and FASCAT 4100 (4.01 g) was charged into a 2 Liter Parr reactor equipped with a mechanical stirrer, distillation apparatus and bottom drain valve. The mixture was heated to 160° C. under a nitrogen purge (1 scfh), and then slowly increased to 190° C. over a 3 hour period and maintained for an additional 3 hours, during which time; water was collected as the byproduct. The mixture temperature was reduced to 140° C. and maintained for 19 hours. Then the reaction temperature was then increased to 205° C. and vacuum was applied to remove the excess 1,4-butanediol to allow further polycondensation. Whilst under vacuum, the mixture was then heated at 225° C., and more FASCAT 4100 (1.03 g) was added to speed up reaction. The experiment monitored by viscosity measurement, and was discharged when viscosity reached 381 cps at 150° C.

Example 4

Synthesis of Sustainable Resin: Polybutylene-Succinate

Succinic acid (295.2 g), 1,4-butane-diol (338.05 g) and FASCAT 4100 (1.5 g) was charged into a 1 Liter Parr reactor equipped with a mechanical stirrer, distillation apparatus and bottom drain valve. The mixture was heated to 160° C. under a nitrogen purge (1 scfh), and then slowly increased to 190° C. over a 3 hour period and maintained for an additional 3 hours, during which time; water was collected as the byproduct. The reaction temperature was then increased to 210° C. and then vacuum was applied to remove the excess 1,4-butanediol to allow further polycondensation. The mixture was then heated at 225° C., whilst under vacuum, until a viscosity of 32 cps at 120° C. was obtained.

Table 1 shows a comparison of several properties between PLA and PBS.

Table 2 shows a comparison of filament properties between the PBS samples and controls.

TABLE 1

Comparison of Properties of PLA and PBS

| Properties | PLA | PBS |
| --- | --- | --- |
| Glass transition temperature (° C.) | 55 | −32 |
| Melting point (° C.) | 170-180 | 114 |
| Heat distortion temperature (° C.) | 55 | 97 |
| Tensile strength (Mpa) | 66 | 34 |
| Elongation at break (%) | 4 | 560 |
| Izod impact strength (J/m) | 29 | 300 |
| Degree of crystallinity (%) | — | 35-45 |

TABLE 2

Filament Properties

| Resin Filaments | Yield stress (MPa) | Yield strain (%) | Breaking stress (MPa) |
| --- | --- | --- | --- |
| Control: ABS Natural | 41.62 | 4.85 | 20.16 |
| Control: PLA True Black | 67.87 | 5.31 | 28.82 |
| Example 1 | 28.44 | 6.3 | 16.25 |
| Example 2 | 35.31 | 16.78 | 19.54 |

Preparation of 3-D Printing Material

Resin filaments from Examples 1 to 4, were prepared using the Melt Flow Index (MFI) instrument. The sample of each of the resins obtained from were melted separately in a heated barrel and extruded through an orifice of a specific diameter, under a certain weight. The resulting resin filaments are flexible and hard. The mechanical properties of the resin filaments were measured using the Instron Tensile Testing System and compared with the commercial ABS (acrylonitrile butadiene styrene) and PLA (Example 3) 3-D materials. Table 2 below shows the yield stress, yield strain, breaking strain and breaking stress for the Resin filaments of Example 1 to 4 and the controls ABS and PLA (true black color).

What is claimed is:

1. A method of printing comprising
providing a thermoplastic filament, wherein the thermoplastic filament further comprises
a sustainable resin derived from a bio-based diacid monomer and bio-based glycol monomer, wherein the bio-based diacid monomer is selected from the group consisting of succinic acid, 2,5-furandicarboxylic acid, itaconic acid and mixtures thereof, and the bio-based glycol monomer is selected from the group consisting of 1,4-butane-diol, 1,3-propane-diol and 1,2-propanediol and mixtures thereof; wherein the sustainable resin has a viscosity of from about 500 centipoise to about 2,000 centipoise at 100° C. to about 200 ° C.;
a colorant, and
an optional additive;
heating the thermoplastic filament to its melting point;
extruding the melted thermoplastic filament layer by layer; and
forming a three-dimensional object from the layers of melted thermoplastic filament.

2. The method of claim 1, wherein the heating step is conducted at a temperature of from about 160 to about 260° C.

3. The method of claim 1, further comprising cooling and solidifying the formed three-dimensional object.

4. The method of claim 1, wherein the bio-based diacid monomer comprises succinic acid.

5. The method of claim 1, wherein the bio-based diacid monomer comprises 2,5-furandicarboxylic acid.

6. The method of claim 1, wherein the bio-based diacid monomer comprises itaconic acid.

7. The method of claim 1, wherein the sustainable resin is derived from about 48 to about 52 percent by mole equivalent of bio-based diacid monomer, and from about 48 to about 52 percent by mole equivalent of the bio-based glycol monomer, provided that the sum of both is 100 percent.

8. The method of claim 1, wherein the sustainable resin is selected from the group consisting of poly-(butylene-succinate), poly-(butylene-2,5-furanate), poly-(butylene-itaconate), poly-(propylene-succinate), poly-(propylene-2,5-furanate), poly-(propylene-itaconate), and mixtures thereof.

9. The method of claim 1, wherein the weight average molecular weight of the sustainable resin is from about 10,000 grams/mole to about 500,000 grams/mole.

10. The method of claim 1, wherein the sustainable resin has a softening point of from about 120 ° C. to about 200 ° C.

11. The method of claim 1, wherein the sustainable resin has a freezing point of from about 20° C. to about 60° C.

12. The method of claim 1, wherein the sustainable resin has a melting point of from about 75° C. to about 150° C.

13. The method of claim 1, wherein the sustainable resin has a Young's Modulus of from about 0.5 to about 5 gigapascals.

14. The method of claim 1, wherein the sustainable resin has a Yield Stress of from about 10 to about 100 megapascals.

15. The method of claim 1, wherein the sustainable resin is present in the thermoplastic filament in an amount of from about 85% to about 100% by weight.

16. A method of printing comprising
providing a thermoplastic filament, wherein the thermoplastic filament further comprises
a sustainable resin derived from a bio-based succinic acid and 1,4-butane-diol, wherein the sustainable resin is poly-(butylene-succinate) having a weight average molecular weight of from about 10,000 grams/mole to about 500,000 grams/mole; wherein the sustainable resin has a viscosity of from about 500 centipoise to about 2,000 centipoise at 100° C. to about 200 ° C.;
a colorant, and
an optional additive;
heating the thermoplastic filament to its melting point;
extruding the melted thermoplastic filament layer by layer; and
forming a three-dimensional object from the layers of melted thermoplastic filament.

17. The method of claim 16, wherein the sustainable resin has a Young's Modulus of from about 0.5 to about 5 gigapascals and a Yield Stress of from about 10 to about 100 megapascals.

18. A method of printing comprising
providing a thermoplastic filament, wherein the thermoplastic filament further comprises
a sustainable resin derived from a bio-based succinic acid and 1,4-butane-diol; wherein the sustainable resin is poly-(butylene-succinate) having a weight average molecular weight of from about 10,000 grams/mole to about 500,000 grams/mole; wherein the sustainable resin has a Yield Stress of from about 20 to about 80 megapascals; wherein the sustainable resin has a viscosity of from about 500 centipoise to about 2,000 centipoise at 100° C. to about 200 ° C.; wherein the sustainable resin has a Tg of from about 50° C. to about 120° C.;
a colorant; and
an optional additive;
heating the thermoplastic filament to its melting point;
extruding the melted thermoplastic filament layer by layer; and
forming a three-dimensional object from the layers of melted thermoplastic filament.

* * * * *